April 16, 1929.    L. L. RICHARDSON    1,709,407
DRILL STEEL RETAINER
Filed March 28, 1927

Inventor
Led L. Richardson
Atty.

Patented Apr. 16, 1929.

1,709,407

UNITED STATES PATENT OFFICE.

LED L. RICHARDSON, OF CLEVELAND, OHIO, ASSIGNOR TO THE CLEVELAND ROCK DRILL COMPANY, OF CLEVELAND, OHIO.

DRILL-STEEL RETAINER.

Application filed March 28, 1927. Serial No. 178,981.

The present invention is directed to improvements in drill steel retainers.

The primary object of the invention is to provide a device of this character which is extremely simple in construction, efficient in operation, durable, and which utilizes one of the side rods of the drill to maintain the same in its operative position thereon.

Another object of the invention is to provide a device of this kind which will be rugged and can be easily attached to or removed from the drill, and when in place thereon will effectively retain the drill steel in its coupled relation with the drill.

With these and other objects in view, this invention resides in the novel features of construction, formation, combination and arrangement of parts to be hereinafter more fully described, claimed and illustrated in the accompanying drawing, in which:—

Figure 1:
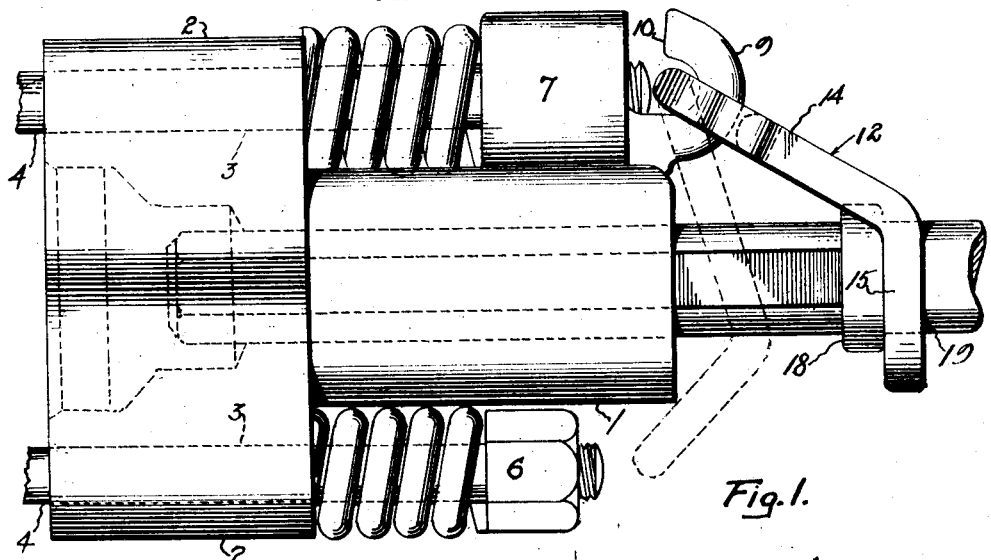
Figure 1 is a side elevation of a drill equipped with the device.
Figure 2:
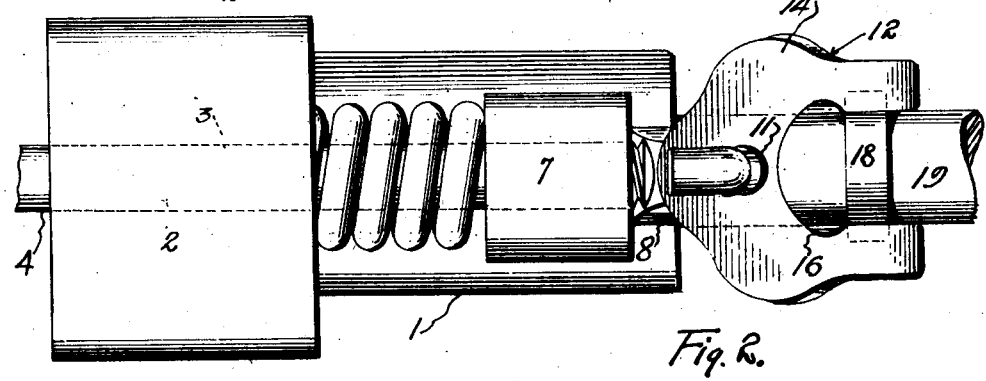
Figure 2 is a top plan view thereof.
Figure 3:
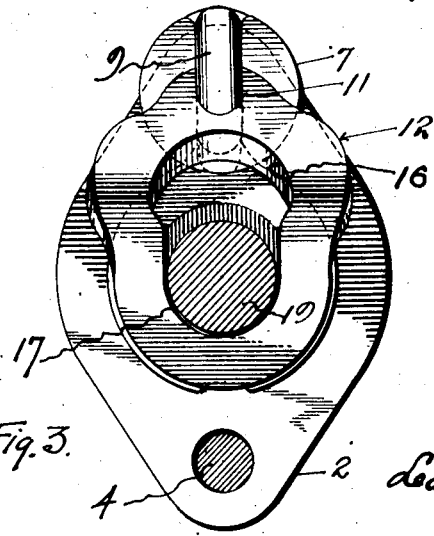
Figure 3 is a front view of the device.

Referring to the drawing, 1 designates the front head of a drill of the percussive type having oppositely disposed ears thereon in which are formed openings 3. It is in these openings that the side rods 4 are engaged employed for securing the front head to the piston cylinder, not shown. Upon one of these rods is engaged the usual clamping nut 6, whereas the other rod has threaded thereon a nut 7 circular in cross section and engaged in the longitudinal groove 8 formed in the front head, and while this nut performs the same function as the nut 6 it also serves to retain the steel retainer in place upon the drill in a manner to be hereinafter explained.

This nut has its forward end provided with an integral hook 9, the bill 10 thereof being spaced from the adjacent face thereof a distance sufficient to permit the upper portion of the rim of the eye 11 of the steel retainer to pass when the retainer is being assembled with the hook 9. The retainer 12 is in the nature of a frame and consists of angularly disposed sections 14 and 15, said sections having formed therein a substantially circular opening 16 and an elongated opening 17, respectively, the openings communicating and forming, in effect, a key-hole slot.

As shown in Figure 1 the collar 18 of the drill steel 19 is engaged with the section 15 and owing to the restricted nature of the opening 17 thereof the collar 18 is prevented from passing therethrough, thus retaining the steel operatively connected to front head 1 of the drill.

When it is desired to remove the steel the retainer is swung to the dotted lined position, as shown in Figure 1 of the drawing, thus bringing the circular opening 16 in registration with the collar 18, and through which it may be withdrawn.

It will be observed upon reference to Figure 1 that the extended end of the rod associated with the nut 7 is so positioned as to restrict the passage between the extended end and the bill 10 of the hook in order to prevent the rim of the eye 11 from passing through the restricted space, thereby positively retaining the retainer in its pivoted position upon the front head.

The nut 7 is screwed upon its rod for a limited distance to enable the rim of the eye 11 of the retainer to be engaged upon the hook 9, after which the nut is further rotated until terminal of the rod 4 approaches the bill to close the gap therebetween sufficiently to prevent disengagement of the eye from the hook.

From the foregoing it will be observed that the nut 7 not only serves its function as a side rod nut, but also serves as means for pivotally securing the retainer upon the front head of the drill.

What is claimed is:—

1. The combination with the front head of a drill, of a collared drill steel operatively connected therewith, side rods for the drill, one nut engaged on the side rod, a hook carried by the nut for movement toward or away from the adjacent end of the side rod, and a drill steel retainer pivotally connected to the hook.

2. The combination with a drill front head, of a side rod therefor, a collared drill steel operatively connected to the head, a nut engaged on the side rod, a hook carried by the nut, a drill steel retainer including an eye for pivotal and detachable engagement with the hook, said nut serving to positively hold the retainer engaged with the hook or to permit its disengagement therefrom.

3. The combination with the front head and side rod of a drill, of a drill steel operatively connected with the front head and having a collar, a nut on the side rod, a drill steel retainer, means for pivotally connecting the retainer on the nut, said means being movable toward and away from the side rod to maintain the steel retainer engaged with or permit the disengagement thereof from said means.

In testimony whereof I affix my signature.

LED L. RICHARDSON.